(12) United States Patent
Paasch

(10) Patent No.: US 8,476,863 B2
(45) Date of Patent: Jul. 2, 2013

(54) ENERGY STORAGE AND CHARGING SYSTEM FOR A VEHICLE

(76) Inventor: Mitchell Andrew Paasch, Lake Odessa, MI (US)

( * ) Notice: Subject to any disclaimer, the term of this patent is extended or adjusted under 35 U.S.C. 154(b) by 390 days.

(21) Appl. No.: 12/781,687

(22) Filed: May 17, 2010

(65) Prior Publication Data

US 2010/0225282 A1    Sep. 9, 2010

(51) Int. Cl.
*H01M 10/44* (2006.01)
*H01M 10/46* (2006.01)
*H02J 7/04* (2006.01)
*H02J 7/16* (2006.01)

(52) U.S. Cl.
USPC ............. 320/101; 320/152; 180/2.2; 180/165

(58) Field of Classification Search
CPC .......................................................... H02J 7/35
USPC ........................... 320/152, 101; 180/2.2, 165
See application file for complete search history.

(56) References Cited

U.S. PATENT DOCUMENTS

| | | | |
|---|---|---|---|
| 3,828,880 A * | 8/1974 | Smith | 180/306 |
| 4,002,218 A | 1/1977 | Horvat | |
| 4,168,759 A * | 9/1979 | Hull et al. | 180/2.2 |
| 4,314,160 A * | 2/1982 | Boodman et al. | 290/55 |
| 4,597,463 A | 7/1986 | Barnard | |
| 5,296,746 A * | 3/1994 | Burkhardt | 290/55 |
| 5,680,032 A * | 10/1997 | Pena | 290/52 |
| 6,014,324 A | 1/2000 | Deck | |
| 6,373,145 B1 * | 4/2002 | Hamrick | 290/44 |
| 6,412,604 B1 | 7/2002 | Schuster | |
| 6,857,492 B1 * | 2/2005 | Liskey et al. | 180/165 |
| 6,882,059 B1 * | 4/2005 | DePaoli | 290/44 |
| 7,078,877 B2 | 7/2006 | Salasoo et al. | |
| 7,135,786 B1 * | 11/2006 | Deets | 290/55 |
| 7,227,274 B2 | 6/2007 | Berkson | |
| 7,277,782 B2 | 10/2007 | Yakes et al. | |
| 7,325,498 B2 | 2/2008 | Kumar et al. | |
| RE40,320 E | 5/2008 | Stevens et al. | |
| 7,448,328 B2 | 11/2008 | Kumar | |
| 7,828,091 B2 * | 11/2010 | Wedderburn et al. | 180/2.2 |
| 2002/0066608 A1 * | 6/2002 | Guenard et al. | 180/65.3 |
| 2003/0057707 A1 * | 3/2003 | Wu | 290/55 |
| 2003/0231000 A1 * | 12/2003 | Teo | 320/101 |
| 2008/0074078 A1 * | 3/2008 | Yang | 320/107 |
| 2008/0211320 A1 | 9/2008 | Cook et al. | |
| 2008/0265684 A1 | 10/2008 | Farkas | |
| 2008/0278264 A1 | 11/2008 | Karalis et al. | |
| 2009/0314567 A1 * | 12/2009 | Harrington | 180/165 |
| 2010/0006351 A1 * | 1/2010 | Howard | 180/2.2 |
| 2010/0052614 A1 * | 3/2010 | Mariels | 320/116 |
| 2010/0109604 A1 * | 5/2010 | Boys et al. | 320/109 |
| 2011/0031934 A1 * | 2/2011 | Pagano | 320/145 |

* cited by examiner

*Primary Examiner* — Drew A Dunn
*Assistant Examiner* — Nathaniel Pelton
(74) *Attorney, Agent, or Firm* — Brinks Hofer Gilson & Lione

(57) ABSTRACT

In a vehicle charging system, conservation of energy may be achieved by an energy-routing device that selectively routes electrical energy generated from moving air to an energy-storage device, to an energy-dissipation device, or to both. The determination of where to route the electrical energy may be based on sensor measurements of voltage, current, and temperature. A processor may use measurements of sensors within the system to determine whether the energy-storage device may safely or efficiently store additional electrical energy.

10 Claims, 5 Drawing Sheets

ENERGY STORAGE AND CHARGING SYSTEM FOR A VEHICLE

BACKGROUND OF THE INVENTION

1. Field of the Invention

This disclosure relates to electrical charging systems, and in particular, relates to storing electrical energy generated by the movement of a vehicle.

2. Related Art.

Alternative sources of energy for vehicles are vitally important for modern society due to the decreasing supply of fossil fuels. One potential source of energy is moving air, whether created by the movement of a vehicle or by wind currents. Electrical energy generated from moving air can be harnessed to further motivate a vehicle or to power the on-board electronics of a vehicle.

Large amounts of power may be generated during the operation of a charging system in a vehicle that generates electrical energy from moving air, especially at high speeds. A vehicle charging system may manage the power generated by moving air with aerodynamic design choices or with changes in the mechanical linkage ratio between system components. The safe and efficient operation of a vehicle may be improved by proper management of the vehicle charging system.

SUMMARY

The descriptions described below include systems and methods for converting and storing energy. The system converts the energy of moving air into electrical energy, which may then be stored or dissipated. In this way, the system is able to manage the power generated by moving air. The system harnesses large quantities of power as the vehicle moves to recharge an electrical storage device or devices. Also, to safely manage unwanted or unusable energy, the system is capable of dissipating some or all of the energy generated. Additionally, the system utilizes efficient aerodynamic design choices to improve system efficiency.

A method regulates the storage of energy within a vehicle. An intake port channels a moving volume of air through an air duct. An electromechanical conversion device converts kinetic energy from the moving volume of air into electrical energy. Whether an energy-storage device has the capacity to store the electrical energy is determined. An energy-routing device selectively routes electrical energy to the energy-storage device, to an energy-dissipation device, or to both.

An electrical charging system for a vehicle manages a vehicle charging system. An intake port and an exhaust port are located on the body of the vehicle. An air duct connects the intake port and the exhaust port. An impeller is rotatably mounted in the air duct. An electromechanical conversion device is mechanically connected to the impeller. An energy-routing device selectively connects the electromechanical conversion device to an energy-storage device, to an energy-dissipation device, or to both.

An electrical charging system charges an electrical storage system. An impeller is rotatably mounted in an air duct. An alternator is mechanically connected to the impeller. A switch selectively connects the alternator to an energy-storage device, to an energy-dissipation device, or to both.

Other systems, methods, features and advantages will be, or will become apparent to one of ordinary skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENT

A vehicle charging system has at least one air intake port located on the vehicle. The intake port's shape, size, or placement may be optimized for creating minimal drag. As the vehicle moves, air travels through the intake port and into an air duct. An impeller is rotatably mounted inside the air duct, and the moving air causes the impeller to rotate. The impeller is connected to an electromechanical conversion device, such as an alternator. The moving air rotates the impeller, which in turn transfers the energy of the moving air to the electromechanical conversion device. The moving air moves out of the air duct through an exhaust port. The electromechanical conversion device converts the energy of the moving air into electrical energy. The electrical energy is then transferred to an energy-routing device, which selectively routes the energy to an energy-storage device, to an energy-dissipation device, or to both.

The energy-routing device may divide the energy between the energy-storage device and the energy-dissipation device. The vehicle charging system may determine the ratio at which the electrical energy is divided based on any number of factors. For example, electrical energy may be divided based on the temperature, voltage, current, or power measured in the vehicle charging system. The electrical power requirements of the vehicle may further determine the ratio at which the electrical energy is divided between the energy-storage device and the energy-dissipation device.

Figure 1:
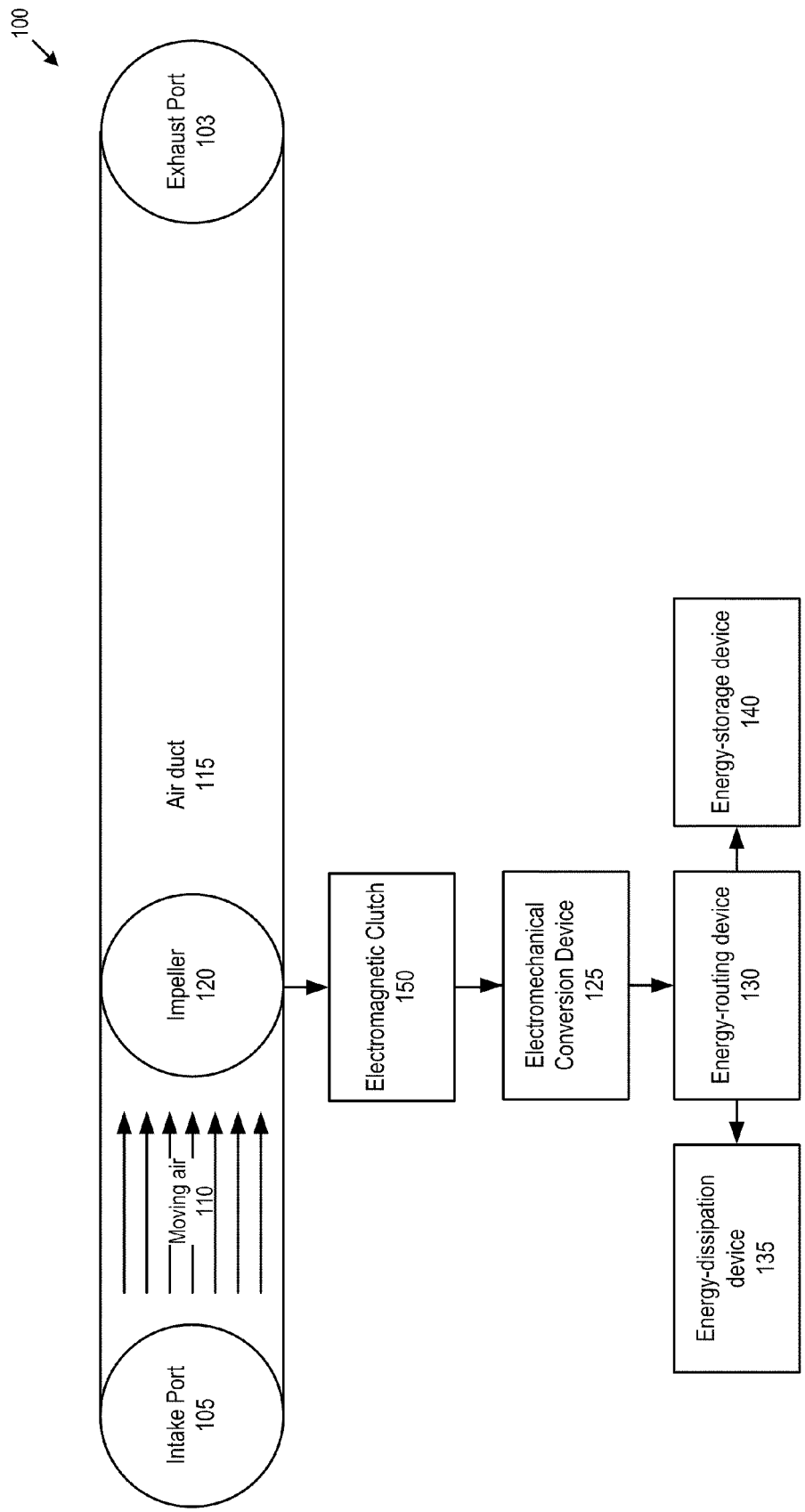
FIG. 1 shows a block diagram of a charging system.

FIG. 1 shows a block diagram 100 of a charging system. An intake port 105 receives an amount of moving air 110. An air duct 115 guides the moving air 110 towards an impeller 120. The moving air 110 induces the impeller 120 to rotate. The moving air exits the air duct via exhaust port 103. The rotating impeller 120 causes the electromechanical conversion device 125 to generate electrical energy. For example, an axle or belt could be used to mechanically connect the impeller and the electromechanical conversion device 125. Alternatively, the electromechanical conversion device 125 may be mounted directly inside the housing of the impeller 120. Preferably, the impeller 120 and the electromechanical conversion device 125 may be connected by an electromagnetic clutch 150. When the electromagnetic clutch 150 is disengaged, the impeller is no longer mechanically connected to the electromechanical conversion device 125 in such a way that the electromechanical conversion device 125 can generate electrical energy from the energy of the rotating impeller. The ability to disengage the electromagnetic clutch 150, and therefore, to halt the generation of electrical energy by the electromechanical conversion device 125 results in a more flexible charging system. If the charging system 100 or its user detects a fault in the charging system, or otherwise determines that additional electrical energy is unnecessary, then the electromagnetic clutch 150 may be disengaged manually or automatically. Disengaging the electromagnetic clutch 150 may reduce wear on the charging system components and increase the longevity of the charging system 100.

The electromechanical conversion device 125 may be an alternator. Examples of alternators include a permanent magnet type alternator or an electromagnet type alternator. A permanent magnet type alternator is preferred due its efficiency. A permanent magnet type alternator begins generating electrical energy upon a first rotation of its magnetic core.

Electrical energy generated by the electromechanical conversion device 125 flows to an energy-routing device 130. The energy-routing device 130 may be a switch, a relay, a potentiometer, a multiplexer, a high-voltage device, or a thyristor. Any device that is capable of selectively directing electrical current may be used.

The energy-routing device 130 then selectively routes the electrical energy to an energy-dissipation device 135, an energy-storage device 140, or to both. The energy-routing device 130 may route the electrical energy according to the state of the energy-storage device 140. For example, the energy-routing device may detect the amount of energy stored in the energy-storage device based on its electrical connection with the energy-storage device. The energy-routing device may use that information to determine whether to route the electrical energy to the energy-storage device.

Figure 2:
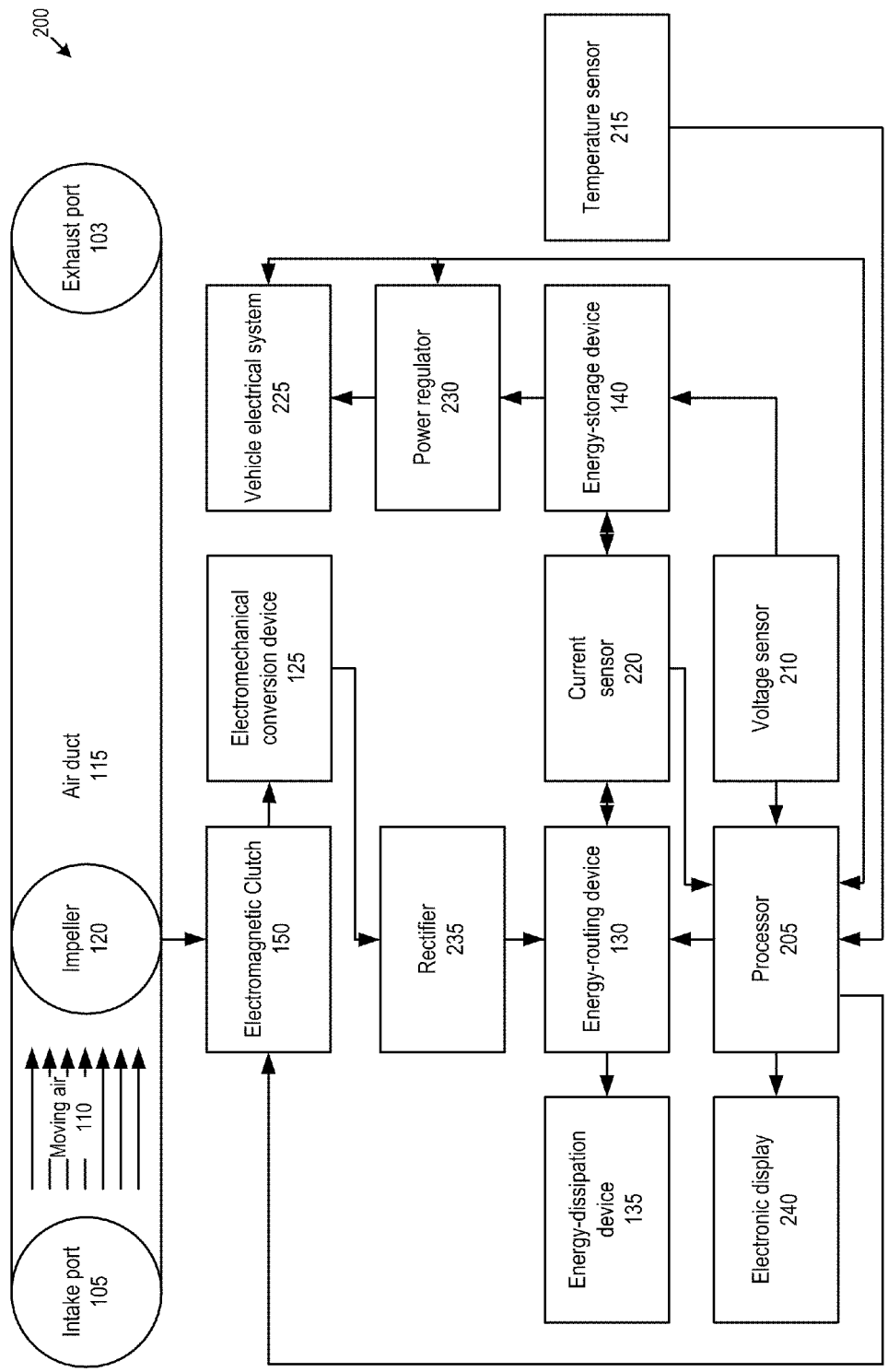
FIG. 2 shows a block diagram of a charging system with additional features.

FIG. 2 shows a block diagram 200 of a charging system with additional features. The energy-routing device 130 routes the electrical energy according to input from a processor 205. The processor may be a microprocessor, an application specific integrated circuit, a microcontroller, or a decoder. The processor 205 gathers information about the charging system from one or more sensors in the system including a voltage sensor 210, a temperature sensor 215, and/or a current sensor 220. Each sensor may detect the status of the energy-storage device 140. The processor 205 may then regulate the current flowing into or out of the energy-storage device 140, the voltage potential across the energy-storage device 140, or the temperature of the energy-storage device 140. The processor 205 may also regulate the current flowing out of the energy-storage device 140 based on the needs of the vehicle electrical system 225. The vehicle electrical system 225 may be in communication with the processor 205 to provide feedback about the power consumption and the electrical energy requirements of the vehicle.

Including one or more sensors in the system may improve the safety and efficiency of the charging system. The sensors may be digital or analog sensors. The processor 205 may use the measurements provided by the sensors to determine the status of the vehicle charging system.

The processor 205 may be programmed with predetermined ranges for voltage, current, temperature, or other diagnostic measures. Using the predetermined ranges, the processor 205 may determine if the system is not functioning properly or is operating inefficiently, and then may make adjustments in the regulation of the charging system. For example, the processor 205 may regulate the flow of power to the vehicle electrical system 225 via a power regulator 230. The processor 205 may regulate the flow of power to the energy-storage device 140 by directing the energy-routing device 130 to selectively connect the electromechanical conversion device 125 to the energy-dissipation device 135, to the energy-storage device 140, or to both.

The vehicle electrical system 225 may consist of any electronic equipment found in vehicles including radios, computers, safety electronics, engine-monitoring electronics, lights, telephones, or batteries. The vehicle electrical system 225 may also include an electric motor used to motivate the vehicle, such as those found in electric and hybrid vehicles. Such motors may include in-wheel electric motors.

The power regulator 230 may be a switch, potentiometer, voltage regulator, current regulator, cable, plug, high voltage multiplexer, resistor, transformer, relay, or a DC/DC converter.

The voltage sensor 210 may be electrically connected to the energy-storage device 140. The voltage sensor 210 may measure the voltage potential across the energy-storage device 140.

The temperature sensor 215 may be located adjacent to the energy-storage device 140, or in proximity to any component of the charging system. The temperature sensor 215 may measure the temperature of the energy-storage device 140.

The current sensor 220 may be connected in series with the energy-routing device 130 and the energy-storage device 140. The current sensor 220 may measure the amount of electrical current that is flowing into or out of the energy-storage device 140.

If the processor 205 determines that the electrical energy should be routed to the energy-storage device 140, then the energy-routing device 130 transfers the electrical energy to the energy-storage device 140. The energy-storage device 140 may be a battery, an array of batteries, a capacitor, an ultra-capacitor, an array of capacitors, or a combination of electrical components.

If the processor 205 determines that the electrical energy should be routed to the energy-dissipation device 135, then the energy-routing device 130 transfers the electrical energy to the energy-dissipation device 135. The energy-dissipation device 135 may be a resistor, a coil, or any type of electrical component that may dissipate electrical energy. For example, the energy-dissipation device 135 may dissipate the electrical energy as heat. Dissipation of the electrical energy avoids any adverse consequences that may result from storing excessive amounts of electrical energy in the energy-storage device 140, such as overheating, igniting a fire, melting components of a vehicle, or burning a vehicle occupant.

If the impeller 120 and the electromechanical conversion device 125 are connected by an electromagnetic clutch 150, then the processor 205 may control the engagement and disengagement of the electromagnetic clutch 150 by an electronic signal. The processor 205 may engage or disengage the electromagnetic clutch 150 based on the power requirements of the vehicle, or based on measurements of voltage, current, temperature, or other diagnostic indicators in the vehicle. The ability to disengage the electromagnetic clutch 150 could reduce mechanical and electrical strain on the charging system 200 and the energy storage device 140, thereby improving the longevity and stability of the vehicle charging system 200.

A rectifier 235 may convert the electrical energy from alternating current into direct current before the electrical energy reaches the energy-routing device 130. The rectifier 235 may be a half bridge rectifier or a full bridge rectifier. The rectifier 235 may also comprise a transformer. The rectifier 235 may allow electrical energy to be stored in a battery or capacitor.

The status of the system as determined by the processor 205 may be displayed on an electronic display 240. The electronic display 240 may be, for example, a liquid crystal display, a light-emitting diode, a group of light-emitting diodes, a group of incandescent light bulbs, a cathode ray tube, or a back-lit group of symbols on a vehicle dash board. The electronic display 240 may alert the pilot, driver, or occupant of the vehicle to any potential safety hazards posed by the operation of the charging system.

The processor 205 may also instruct the energy-routing device 130 to divide the electrical energy between the energy-storage device 140 and the energy-dissipation device 135. In this case, part of the electrical energy is stored and part of the electrical energy is dissipated. The processor 205 may divide the electrical energy when the measurements of temperature, voltage or current are marginally within a predefined range. Such a situation may indicate a future problem or an imminent safety hazard, and therefore the processor 205 may attempt to mitigate the problem by dissipating some of the electrical energy or regulating the electrical energy flowing into the vehicle electrical system 225. Keeping the stored energy within a particular range may also optimize the system, for example, by maximizing the operating capacity and life of the storage device 140.

Figure 3:
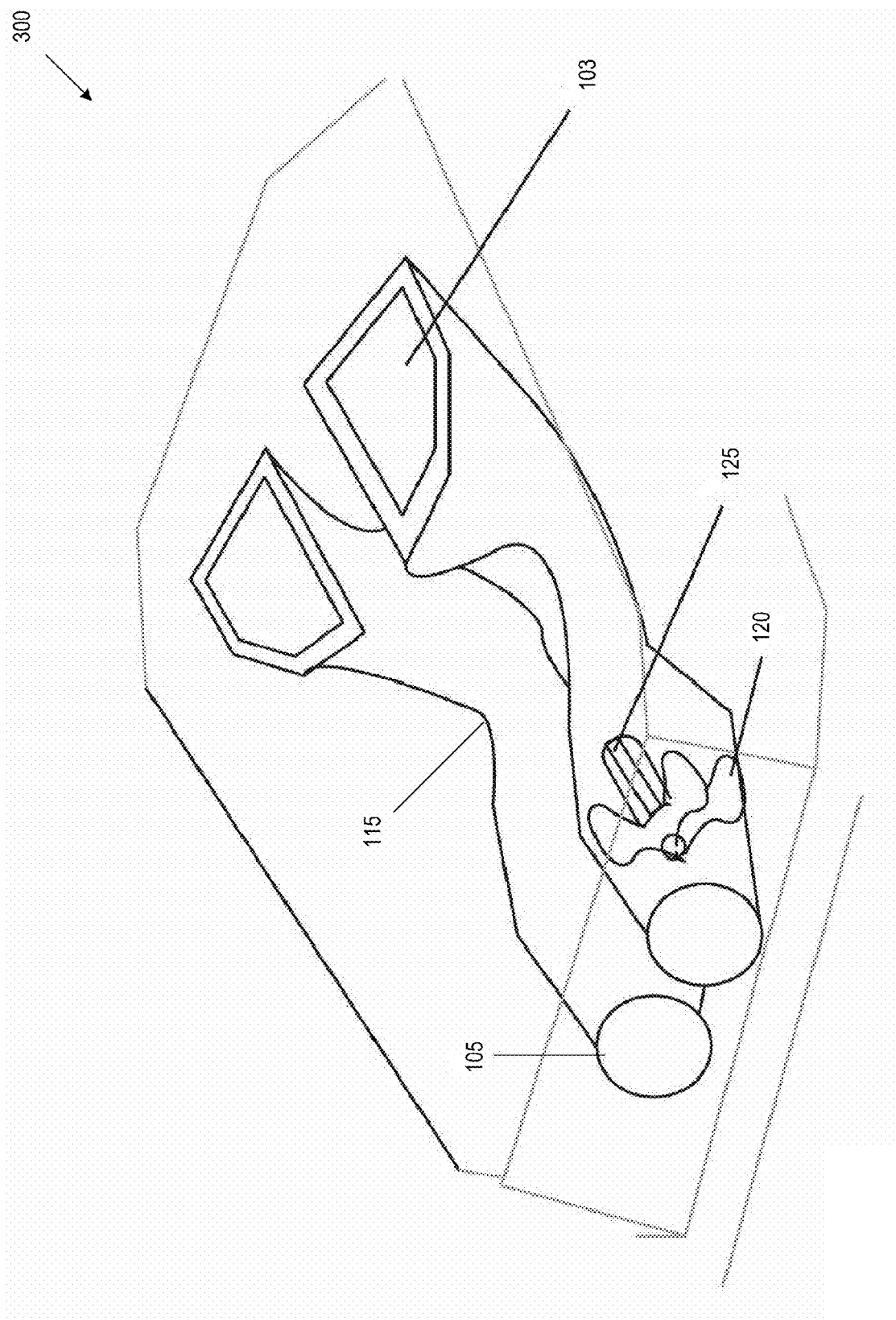
FIG. 3 shows an illustration of a charging system as installed in the body of a vehicle.

FIG. 3 shows an illustration 300 of a charging system as installed in the body of a vehicle. An intake port 105 is located at the front of the vehicle. The intake port 105 may be specifically sized to minimize drag, but also to maximize airflow through the air duct 115.

The impeller 120 is rotatably mounted in the air duct 115. The impeller 120 may be designed to have maximum lift and minimum drag. The air duct 115 may be any enclosure, tunnel, or tube. The electromechanical conversion device 125 may be located within the housing of the impeller 120. An exhaust port 103 may be installed at the rear of the vehicle, in the hood of the vehicle, or wherever the optimal aerodynamic placement of the port may be. After air moves past the impeller 120, it continues down the air duct 115 to the exhaust port 103. The exhaust port 103 may be optimized to reduce drag and increase airflow through the air duct 115.

Figure 4:
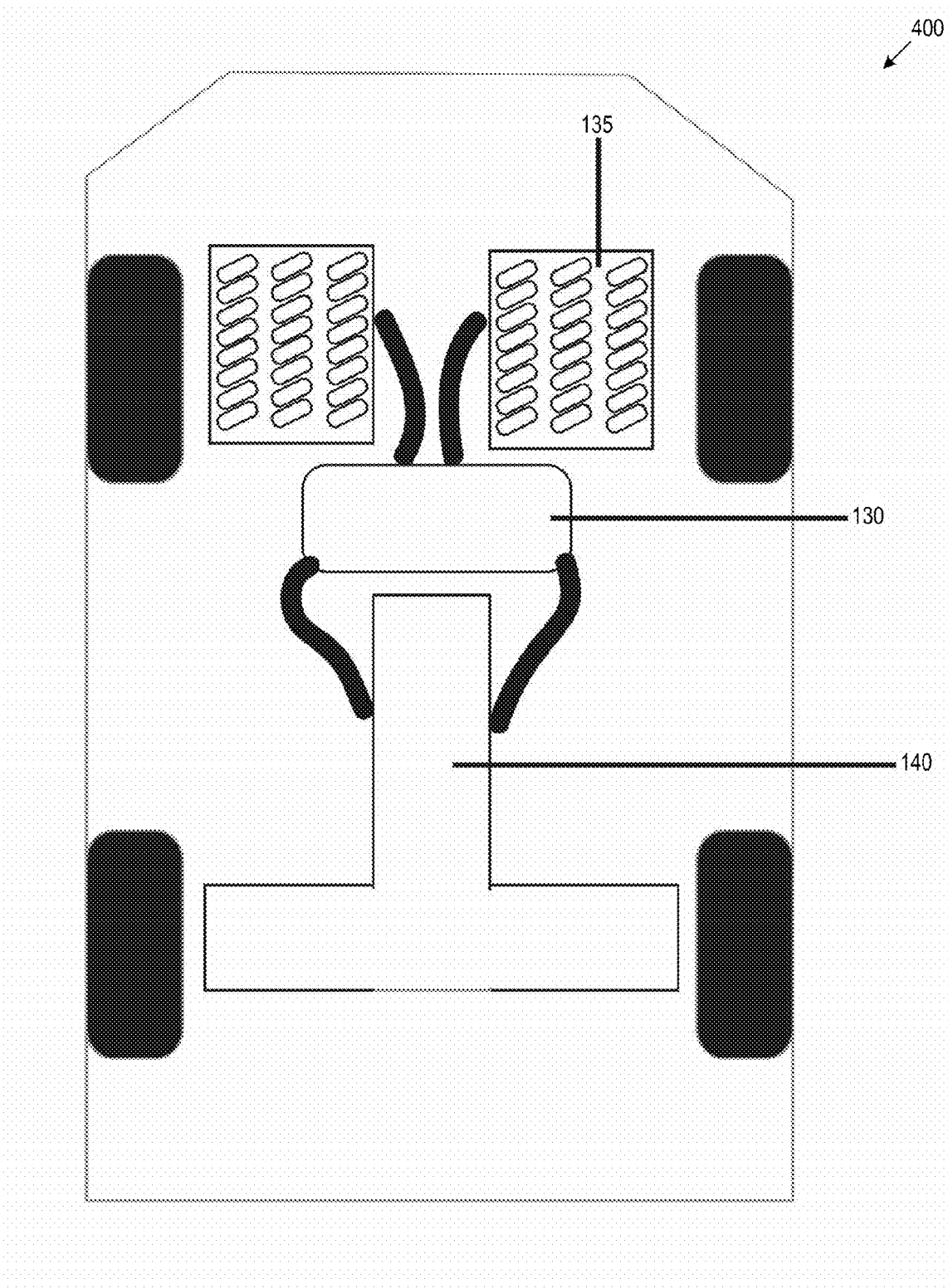
FIG. 4 shows a bottom view of a vehicle equipped with a charging system.

FIG. 4 shows an illustration 400 of a vehicle equipped with a charging system from a view below the vehicle. The energy-routing device 130 routes the electrical energy to the energy-storage device 140, to the energy-dissipation device 135, or to both. The energy-dissipation device 135 may be a resistor with a large surface area for improved heat dissipation. The large surface area of the resistor allows heat to dissipate from the underside of the vehicle as air flows underneath the vehicle. Alternatively, the energy-dissipation device 135 may be located anywhere on or in the vehicle. For example, the energy-dissipation device 135 may be located to heat the interior compartment of the vehicle. Furthermore, the energy-dissipation device may be capable of wirelessly transmitting the electrical energy to dissipate the energy. For example, the energy-dissipation device could inductively charge other electrical devices in proximity to the vehicle.

Figure 5:
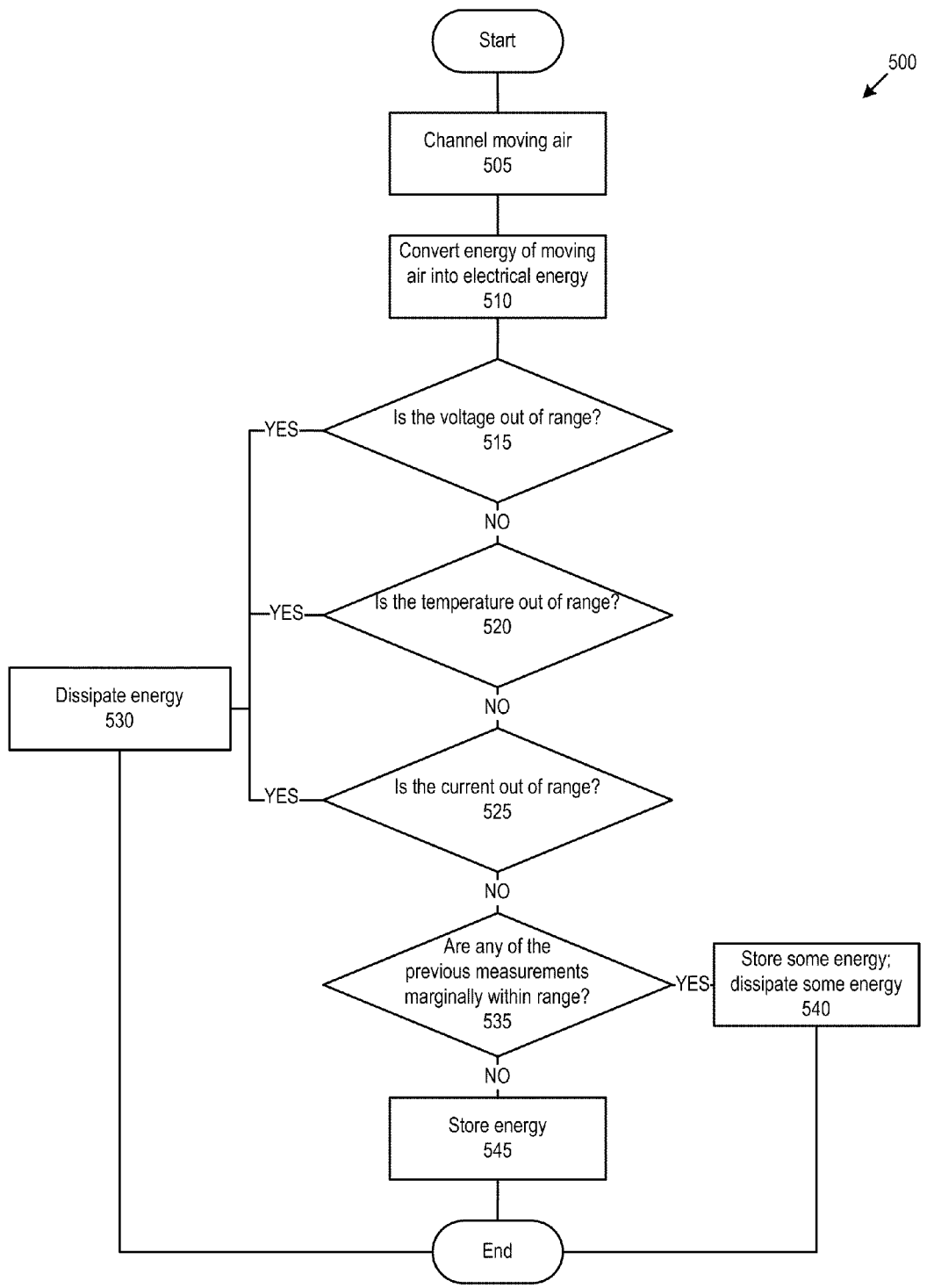
FIG. 5 shows a charging method flow diagram.

FIG. 5 shows a flow diagram 500 of a method for storing energy. A volume of moving air is channeled 505 into an air duct. An intake port may channel the moving air. The kinetic energy of moving air is converted 510 into electrical energy. An electromechanical conversion device may perform the conversion. Measurements of voltage 515, temperature 520, and current 525 are made. Sensors may take the measurements and relay the measurements to a processor for processing and storage. If any of the measurements are out of their respective predefined ranges, then the electrical energy may be dissipated 530. If the measurements are marginally within range 535, then the electrical energy may be dissipated in part, and stored in part 540. Otherwise, the electrical energy may be stored 545.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

Specific components of the disclosed systems may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various examples of the vehicle charging system have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for regulating the storage of energy within a vehicle comprising:
channeling a moving volume of air through an air duct connecting an intake port to an exhaust port;
converting kinetic energy from the moving volume of air into electrical energy using an electromechanical conversion device;
determining whether to store the electrical energy with an energy-storage device, whether to dissipate the electrical energy with an energy-dissipation device, or whether to store a first amount of the electrical energy with the energy-storage device and dissipate a second amount of the electrical energy with the energy-dissipation device;
selectively routing the electrical energy to either the energy-storage device, or to an energy-dissipation device, or a first amount of electrical energy to the energy-storage device and a second amount of the electrical energy to the energy-dissipation device; and
displaying in the vehicle a status of the electrical charging system,
wherein the step of determining whether to store the electrical energy with an energy-storage device comprises determining the electrical energy requirements of an electrical system of the vehicle,
wherein the step of selectively routing electrical energy comprises routing the electrical energy according to the determined electrical energy requirements, and routing the electrical energy only to the energy-dissipating device when the energy-storage device is determined to be full,
wherein the step of channeling a moving volume of air through an air duct comprises channeling the moving volume of air into an intake port located at the front of the vehicle and facing a forward direction of travel of the vehicle, and channeling the moving volume of air out of an exhaust port located at the rear of the vehicle and facing an upward direction in reference to the forward direction of travel of the vehicle,
wherein the air duct is formed in the body of the vehicle,
wherein the step of converting kinetic energy from the moving volume of air into electrical energy using an electromechanical conversion device comprises using the electromechanical conversion device that is located within a housing between the intake port and the exhaust port,
wherein an impeller is rotatably mounted within the housing and is coupled with the electromechanical conversion device,
wherein the energy-dissipation device is an electrical device through which electrical current flows,
wherein the impeller is coupled with the electromechanical conversion device by way of an electromagnetic clutch,
wherein the energy-storage device is used in part to supply power to electric motors located in a plurality of wheels of the vehicle,
wherein the energy-dissipation device is located on an exterior underside of the vehicle,
wherein the energy-dissipation device is a resistive device, and
wherein the energy-dissipation device is configured to radiate electrical energy to inductively charge a device in proximity to the vehicle and on a roadway on which the vehicle travels.

2. The method of claim 1 wherein the energy-dissipation device dissipates energy as heat, the heat being used to heat a portion of an interior component of the vehicle.

3. The method of claim 1 wherein the energy-dissipation device is a resistor in two halves with a total surface area less than that of the underside of the vehicle and located on the underside of the vehicle.

4. An electrical charging system for a vehicle comprising:
an intake port located in a front bumper of a vehicle and an exhaust port located on a flat surface at the rear of the vehicle;
an air duct connecting the intake port to the exhaust port;
an impeller rotatably mounted within the air duct;
an electromechanical conversion device mechanically connected to the impeller by way of an electromagnetic clutch that is selectively engaged or disengaged;
an energy-storage device that stores electrical energy;
an energy-dissipation device located on an exterior underside of the vehicle, the energy-dissipation device having an electrical resistance and configured to dissipate electrical energy while electric current is flowing through the energy-dissipation device;
an energy-routing device configured to selectively make an electrical connection between the electromechanical conversion device and the energy-storage device, the energy-dissipation device, or both;
a processor controllably connected to the energy-routing device, the processor configured to control the energy-routing device by making a determination as to whether electrical energy should be routed to the energy-dissipation device, the energy-storage device, or both, based on demands of a plurality of electrical components in the vehicle, a voltage across the energy-storage device, a current flowing into the energy-storage device, and a temperature of the energy-storage device, and changing a state of the energy-routing device as a result of determining whether electrical energy should be routed to the energy-dissipating device such that an amount of electrical energy flows into the energy-dissipating device based on the determination; and
a display in communication with the processor configured to display the status of the electrical charging system,
wherein the processor is configured to route increased electrical energy to the energy-storage device via the energy-routing device at times of increased demand for electrical energy by the plurality of electrical components in a vehicle, and to route decreased electrical energy to the energy-storage device via the energy-routing device at times of decreased demand for electrical energy by the plurality of electrical components in a vehicle or at times when the voltage across the energy-storage device, the current flowing into the energy-storage device, or the temperature of the energy-storage device are outside of a predetermined range,
wherein the processor is configured to route electrical energy via the energy-routing device in excess of the demand for electrical energy by the plurality of electrical components in a vehicle to the energy-dissipation device and not to the energy-storage device,
wherein the energy-storage device is used in part to supply power to electric motors located in a plurality of wheels of the vehicle, and
wherein the energy-dissipation device is configured to radiate electrical energy to inductively charge a device in proximity to the vehicle and on a roadway on which the vehicle travels.

5. The electrical charging system of claim 4 further comprising:
- a temperature sensor located adjacent to the energy-storage device and communicatively connected to the processor;
- a voltage sensor communicatively connected to the processor; and
- a current sensor communicatively connected to the processor.

6. The electrical charging system of claim 4 wherein the processor is controllably connected to the electromagnetic clutch to control the engagement and disengagement of the electromagnetic clutch based on the power requirements of the vehicle, or based on the demands of the plurality of electrical components in the vehicle, and measurements of voltage, current, and temperature in the vehicle.

7. The electrical charging system of claim 6 wherein the energy-dissipation device is a resistor in two halves with a total surface area less than that of the underside of the vehicle and located on the underside of the vehicle.

8. The electrical charging system of claim 4 wherein the electric motors located in the plurality of wheels of the vehicle are primary motivators of the vehicle.

9. The electrical charging system of claim 4 wherein the energy-dissipation device is substantially flat.

10. The electrical charging system of claim 4 wherein the energy-dissipation device is a resistor in two flat halves with a total surface area less than that of the underside of the vehicle.

* * * * *